United States Patent
Pagdin et al.

[15] 3,651,690
[45] Mar. 28, 1972

[54] APPARATUS FOR MEASURING OUTPUT CHARACTERISTICS OF A ROTARY MOVING PART

[72] Inventors: Brian Colin Pagdin, Sutton Coldfield; Brian Michael Forster, Harthill, Near Sheffield, both of England

[73] Assignee: G.K.N. Birfield Transmissions Limited, Birmingham, England

[22] Filed: Aug. 4, 1969

[21] Appl. No.: 847,298

[30] Foreign Application Priority Data

Aug. 2, 1968  Great Britain ..................... 36,905/68

[52] U.S. Cl. .................................. 73/117, 73/126, 73/134, 235/150.2
[51] Int. Cl. ..................................... G01m 15/00
[58] Field of Search ............... 73/117, 116, 117.3, 133, 506, 73/136, 123, 126; 235/150.2

[56] References Cited

UNITED STATES PATENTS

| | | | |
|---|---|---|---|
| 394,435 | 12/1888 | Baumann | 73/469 X |
| 3,201,982 | 8/1965 | Kennedy | 73/136 |
| 3,289,471 | 12/1966 | Maxwell | 73/117 |
| 3,505,863 | 4/1970 | Lucia | 73/116 |

*Primary Examiner*—Jerry W. Myracle
*Attorney*—Spencer & Kaye

[57] ABSTRACT

The invention provides a dynamometer for measuring velocity, acceleration, torque and other quantities relative to the performance of a road vehicle or machine and comprises a plurality of roller assemblies on which the road wheels of the vehicle rest and which themselves form an inertia load or are connected to a flywheel forming an inertia load, each roller assembly driving a pulse generator producing a train of primary pulses which are gated with longer master control pulses to provide successive groups of primary pulses of the order of 0.1 seconds duration. Successive groups are operated upon by arithmetical circuits of an electrical computer to derive output signals representing velocity, acceleration or such other quantity as may be required to be determined, this or these quantities being stored in storage circuits which are constantly updated but can be held or frozen at a particular value by a trigger signal generated in response to attainment of a predetermined value of one of said quantities such as maximum value. The quantities are displayed digitally or graphically on a cartesian plotter unit.

13 Claims, 10 Drawing Figures

Inventors:
Brian Colin Pagdin
Brian Michael Forster

By: Spencer & Kaye
Attorneys

Inventors:
Brian Colin Pagdin
Brian Michael Forster

By: Spencer & Kaye
Attorneys

APPARATUS FOR MEASURING OUTPUT CHARACTERISTICS OF A ROTARY MOVING PART

BACKGROUND OF THE INVENTION

1. Field of the Invention

This invention relates to a method of, and apparatus for, measuring one or more terms denoting output characteristics pertaining to a moving part of a vehicle, machine or other apparatus.

One of the main applications of the present invention is to the measurement of one or more of the quantities, velocity, acceleration, torque, and brake horse power presented by the driving wheel or wheels of a motor road vehicle when power is being transmitted thereto from the prime mover incorporated in the vehicle, and to measure one or more of the quantities deceleration, braking torque, and distance travelled, expressed either as an angular or a linear quantity when the brakes of the vehicle are applied. It will be understood, however, that the invention is not limited to this particular application and may be applied to determine the same or analogous quantities in respect of a movable rotary driven part on any machine or other apparatus in relation to which this requirement arises.

2. Description of the Prior Art

Various forms of apparatus for measuring quantities, such as those mentioned in respect of motor road vehicles, are already known. In one of these, known as an absorption dynamometer, the power available at the driving wheel or wheels of the vehicle is dissipated (in the form of heat) in an absorption means such, for example, as a mechanical brake, or in an electrical load where the absorption means includes a rotary electrical generator driven from the driving wheel or wheels of the vehicle.

The requirement to absorb power at the relatively high rates at which it can be delivered (for example some road vehicles develop brake horse powers in the region of 350) is a serious draw-back to such methods and apparatus, both on account of the expense of providing adequate absorption means, and on account of the need to discard the heat generated in some manner which does not adversely affect working conditions in the vicinity of the apparatus.

Dynamometers (known as inertia dynamometers) are also known where power from the vehicle wheels serves to accelerate rollers to which energy is transferred (as kinetic energy). The velocity reached is displayed by steady state indicating means. Acceleration determination involves measurement of a relatively long time interval between different velocities, say, those corresponding to 30 m.p.h. and 60 m.p.h. Inertia dynamometers are also known for testing the brakes of vehicles wherein the vehicle wheels are driven up to a predetermined speed by respective motor driven rollers in contact with the wheels and serving, by virtue of their inertia, to store kinetic energy which has to be dissipated by application of the vehicle brakes. In this form of apparatus the number of revolutions made by the rollers after application of the vehicle brakes and before the rollers come to rest is determined to evaluate stopping distance.

These forms of inertia dynamometer do not permit of rapid determination of quantities such as acceleration, power, at any stage during the testing cycle.

One of the objects of the present invention is to provide a new or improved method by which the disadvantage inherent in absorption dynamometers is avoided, and which enables the required quantities to be measured quickly and accurately.

SUMMARY OF THE INVENTION

From one aspect the present invention resides in the provision of an inertia dynamometer for measuring one or more selected quantities in an equation of motion of a rotary output member of a vehicle or machine and comprising a supporting structure, means providing a rotary inertia load including roller means rotatably mounted on said supporting structure for contacting said output member, and measuring means operatively associated with said roller means for measuring said quantity, wherein the measuring means comprises means for generating a series of primary signals, the number of which occurring in a given period is dependent upon the angular displacement of said roller occurring in the same period, an electrical computer means including means for storing said primary signals, means for performing arithmetical operations on said stored signals in a manner to derive an output signal representative of said selected quantity or quantities, means responsive to receipt of said output signals for displaying said quantity or quantities.

The primary signals are preferably generated, in response to rotation of the rotary inertia means, at a repetition rate such that in each complete revolution of the rotary inertia means a plurality of such signals occur. The number generated per revolution is advantageously high enough to provide sufficient data (within the time interval occupied by a complete revolution) to enable quantities involving a second order time differential of angular displacement to be determined. Thus the number of signals per revolution may be at least 50, and preferably is of the order of 1,000.

From a further aspect the invention resides in a method of measuring the quantity which appears in the equation of motion of a rotary output part of a vehicle, machine or other apparatus, characterized in that such method comprises the steps of bringing the rotary output part into driving relation with a rotary inertia means operating a prime mover of the apparatus or a braking means provided thereon to bring about acceleration or deceleration of the rotary inertia means respectively, generating a series of primary signals, the number of which occurring in a given time interval is related to the angular displacement imparted to the inertia means in the same time period, feeding said primary signals to an electrical computer means and operating arithmetically on the primary signals to derive an output from the computer means representing the quantity to be determined.

The invention will now be described, by way of example, with reference to the accompanying drawings wherein.

Figure 7:
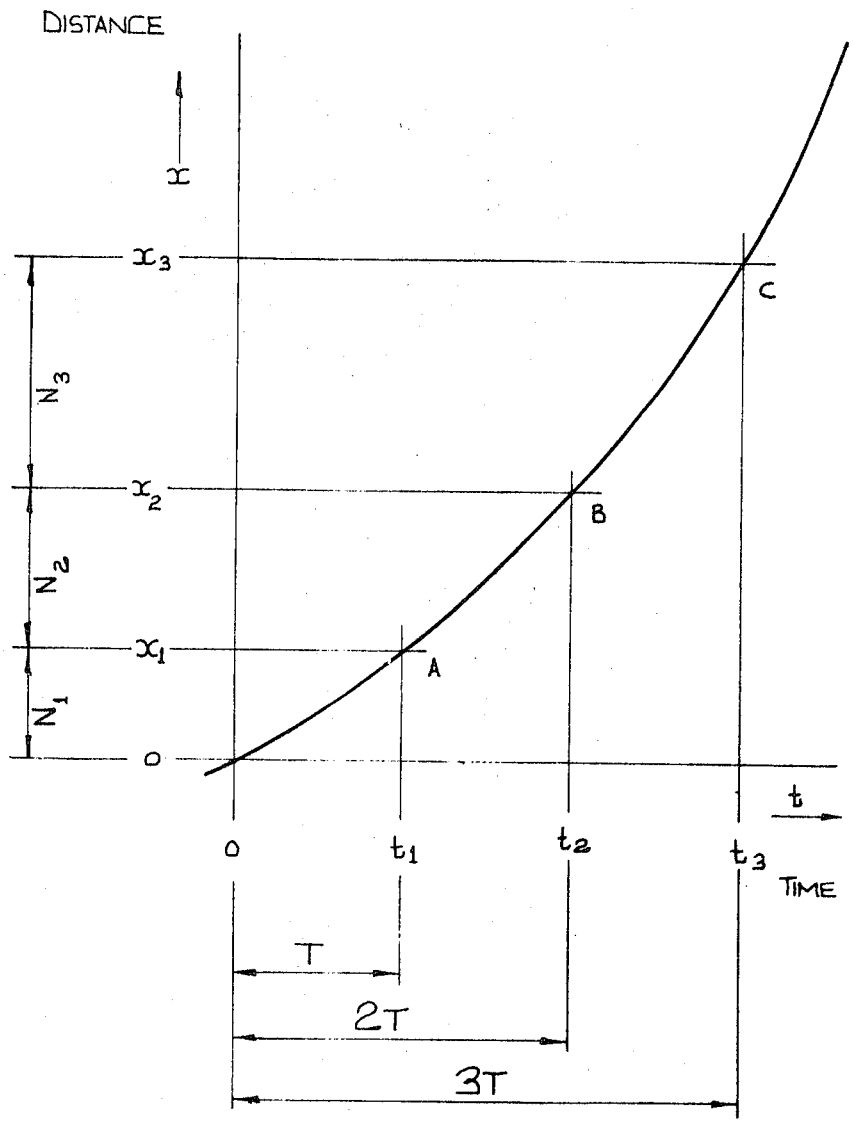
Figure 8:
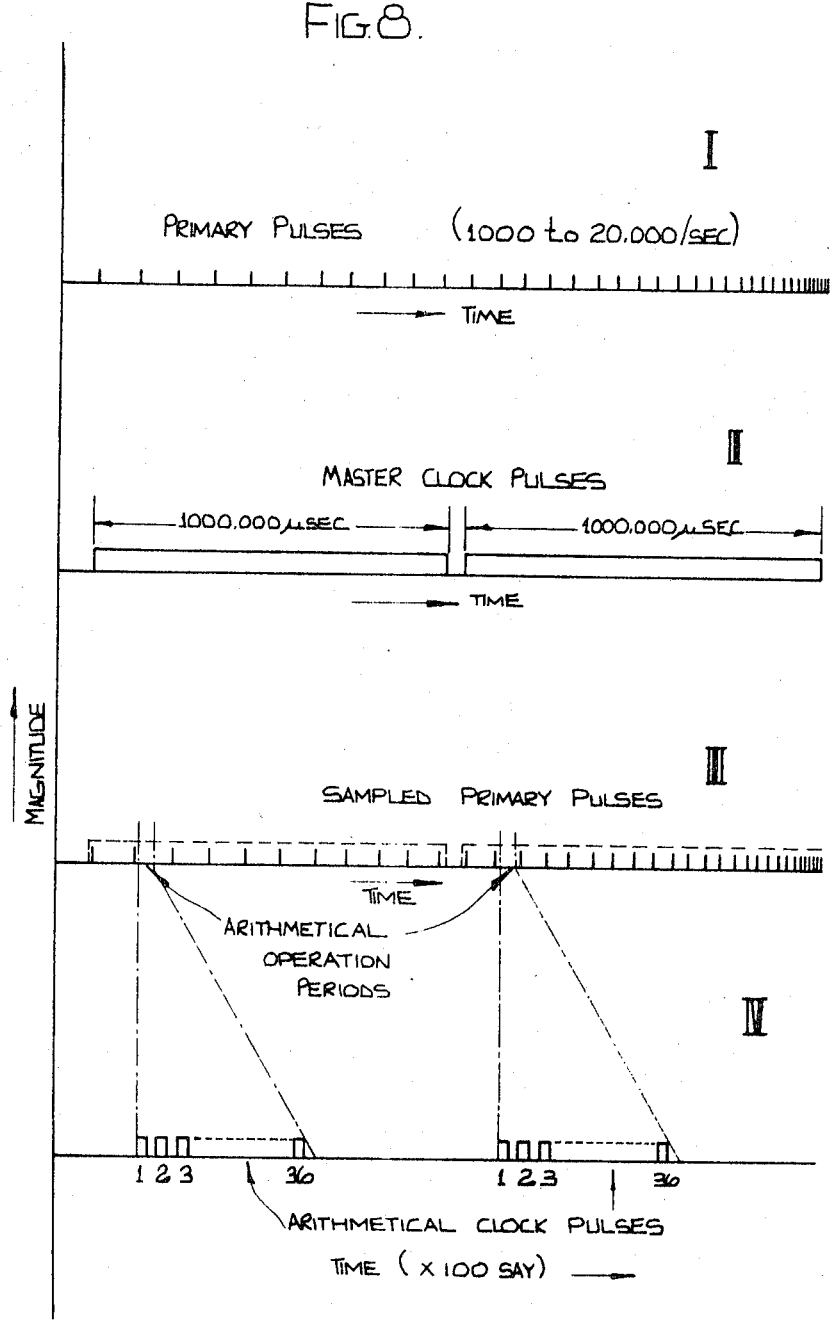
Figure 9:
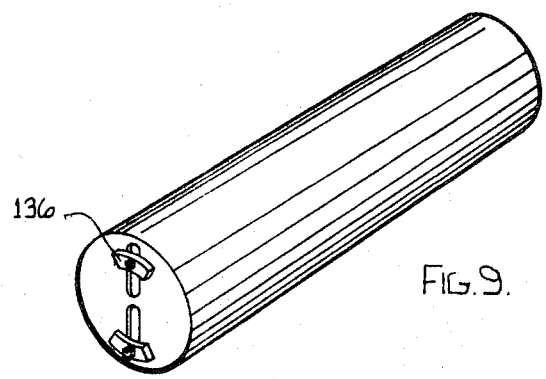
Figure 10:
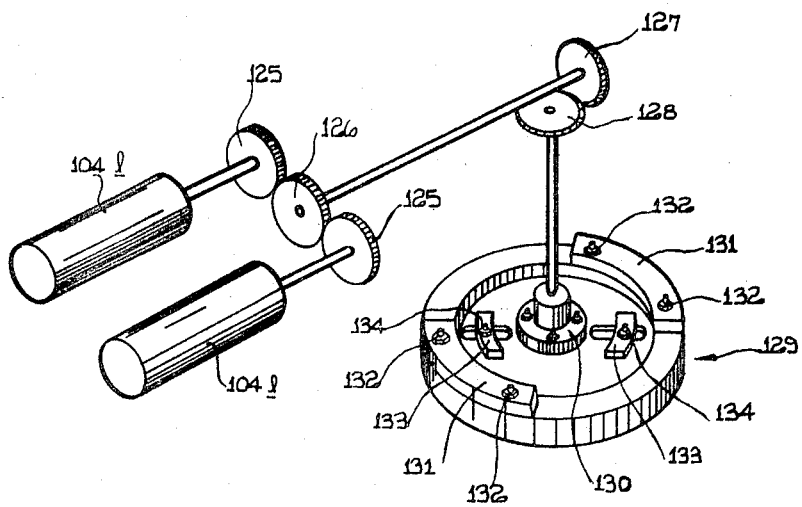

FIG. 7 is a graphical representation of a typical acceleration curve for a motor road vehicle of which the prime mover is an internal combustion engine; and FIG. 8 is an approximate graphical representation of the time relationships between the primary signals, the control pulses furnished by a master clock for determining sampling periods, and pulses furnished by an arithmetical clock for controlling the sequence of arithmetical operation in each sampling period;

FIG. 9 shows an arrangement for providing additional bob-weights on one or more of the rollers and for positionally adjusting the weights; and FIG. 10 shows diagrammatically a modification wherein one or more of the roller assemblies is connected to a flywheel having detachable and/or adjustable bob-weights.

The embodiment of the apparatus now described has been designed for measurement of quantities involved in, or pertaining to, the equation of motion of the driving wheels of a motor vehicle, such as:

a. Maximum torque (and acceleration).
b. Maximum brake horse power.
c. Velocity at which (a) or (b) occur.
d. Torque at a predetermined velocity (60 m.p.h.).
e. Brake horse power at a predetermined velocity (60 m.p.h.).
f. Time to accelerate from 30 m.p.h. to 60 m.p.h.
g. Distance travelled by the left-hand driving wheel (during braking).
h. Distance travelled by the right-hand driving wheel (during braking).
i. Difference between (g) and (h) (during braking) and optionally the following further determinations.
j. Torque plotted against velocity.
k. Brake horse power plotted against velocity.
l. Deceleration plotted against distance travelled for the left-hand wheel.
m. Deceleration plotted against distance travelled for the right-hand wheel.
n. Deceleration plotted against brake pedal load for the left-hand wheel.
o. Deceleration plotted against brake pedal load for the right-hand wheel.

Further, the apparatus may include:

p. Recording means, e.g., tape punching device for recording any of the above quantities.
q. Display of road velocity continuously throughout each test.

It will be understood that determination of these quantities is exemplary only and that the apparatus may be designed in accordance with the invention to determine different quantities in respect of the testing of a motor road vehicle as desired. Furthermore, alternative embodiments of the invention similar to, but not identical with, that now described, may be provided for measuring quantities pertaining to the rotary output member of other vehicles, machines and apparatus and the physical construction and arrangement of parts would be modified in any suitable manner to permit the measuring apparatus to be applied to the vehicle machine or apparatus in question.

Referring firstly to the mechanical arrangement of parts of the apparatus, this may comprise any suitable form of body or supporting structure including a bed plate or platform seen in outline at 101 onto which the vehicle 102 concerned can be driven under its own power. Such bed plate or platform may include apertures 103 at positions corresponding to those at which the wheels of a vehicle would otherwise rest on the bed plate or platform, and in each aperture may be provided a roller assembly, each such assembly including two rollers 104*l*, 104*r* spaced apart in a direction fore and aft of the platform or bed plate to engage beneath an associated road wheel 105 of the vehicle at a distance forwardly of a vertical plane passing through the axis of the wheel and at a distance rearwardly of such plane respectively.

To enable the measuring apparatus to handle a wide variety of different motor road vehicles, the roller assemblies, or certain of them, may be supported from the frame or body by mounting means permitting of positional adjustment to suit wheel base dimensions and track of the vehicle. Thus, the roller assemblies for supporting one pair of wheels (the rear wheels as shown) may be carried by a beam 106 movable along parallel guide and support bars 107, for example by a motor 108 driving pinions 109 through gear box 110, shafts 111 and gear boxes 112.

Further, the roller assemblies for supporting the wheels at one side of the vehicle may be mounted for lateral adjustment, for example, by being supported on slides 113 movable laterally of the vehicle in apertures 114 in beams 106 on slide bars 115 by motor 116 through shafts 117, 118 and gear boxes 119, 120 driving pinions meshing with racks on the slides. Shaft 118 includes telescoping sections coupled for torque transmission by splines or the like and providing freedom for longitudinal adjustment of movable beam 106 relative to fixed beam 121.

The rollers 104*l*, 104*r* of each roller assembly may be of a weight and dimensions to enable the rollers collectively to constitute a rotary inertia means presenting an inertia load suitable for the range of vehicles to be tested. Alternatively bob-weights 136 may be provided bolted inside or at the ends of the rollers to vary the moment of inertia, as seen in FIG. 9. Alternatively, as seen diagrammatically in FIG. 10, at least one of the rollers of each assembly may be coupled through suitable transmission means such as spur gears 125, 126 and bevel gears 127, 128 to a rotary inertia member such as flywheel 129. The latter may be detachably mounted on a driving hub 130 to permit it to be removed and replaced by other rotary inertia members presenting moments of inertia of different values. Alternatively the flywheel inertia member may be so formed or constructed as to permit the value of the moment of inertia presented to be varied as required, for example by bob-weights 131 secured detachably to its ram by bolts 132 and/or bob-weights 133 secured by bolts 134 for positional adjustment towards and away from the axis of rotation along radial slots 134. A similar adjustable mounting for the bob-weights 136 at the ends of the rollers could be provided if required.

To enable testing of the braking means of vehicle to be carried out, at least one, and preferably both, of the rollers 104*l*, 104*r* of each roller assembly may be driven when required from a motor 122, such as an electric motor. In the case of one pair of rollers the drive is through a shaft including telescoping sections to accommodate lateral adjustment of the roller assembly. This may be effected through the intermediary of a unit 123 which is either freewheel, or a clutch means which locks or is engaged when the motor runs the wheels up to speed so that each wheel attains the same speed, but which free wheels or is disengaged when the apparatus is in use to measure braking performance, so as to detect differences in the performance of the brakes for respective wheels.

When measuring quantities pertaining to the driven state of the vehicle, that is to say when power is being supplied from the prime mover to the driving wheels, the clutch devices 123 may be disengaged and each driving wheel is then loaded individually by its rollers 104*l* and 104*r*. Alternatively the devices 123, if clutches, can be engaged or if free wheels can be locked and coupling is then established through motor 122 which would be switched off. This prevents substantial difference in the speeds of the driving wheels of the vehicle due to operation of the vehicle differential gear.

Figure 1:
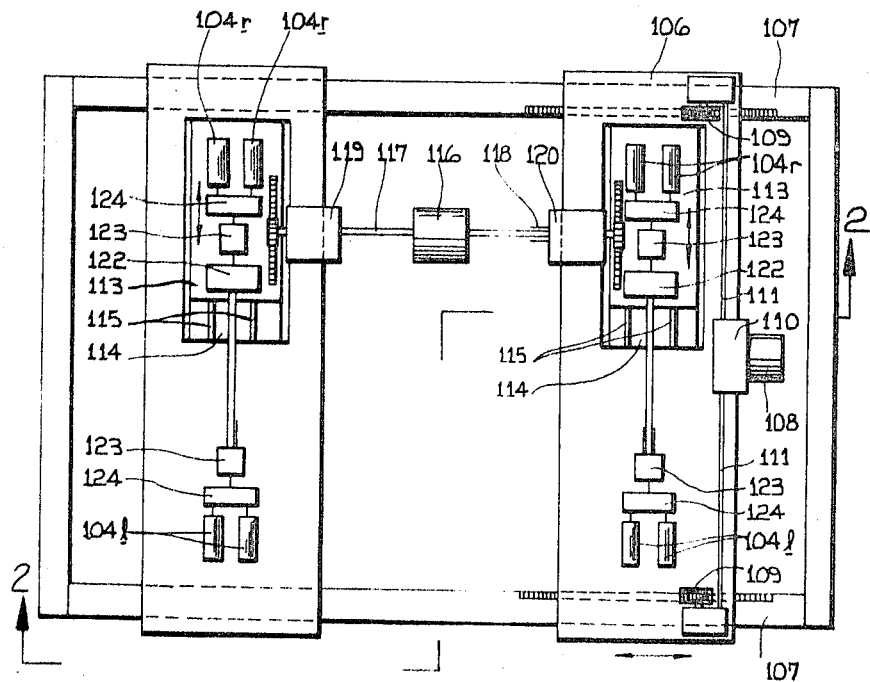
FIG. 1 is a diagrammatic plan view of one embodiment of apparatus in accordance with the invention for performing the method thereof, the bed plate of the apparatus being removed to show the arrangements for driving the roller assemblies.
Figure 2:
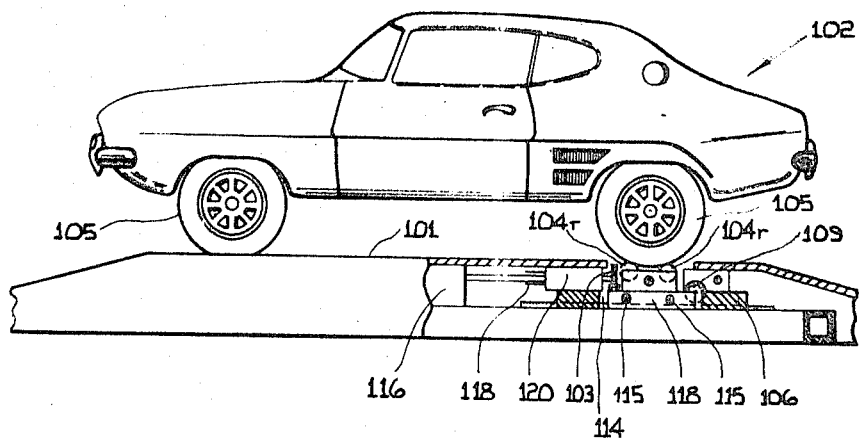
FIG. 2 is a fragmentary view in side elevation and in cross section on the line 2—2 of FIG. 1.
Figure 3:
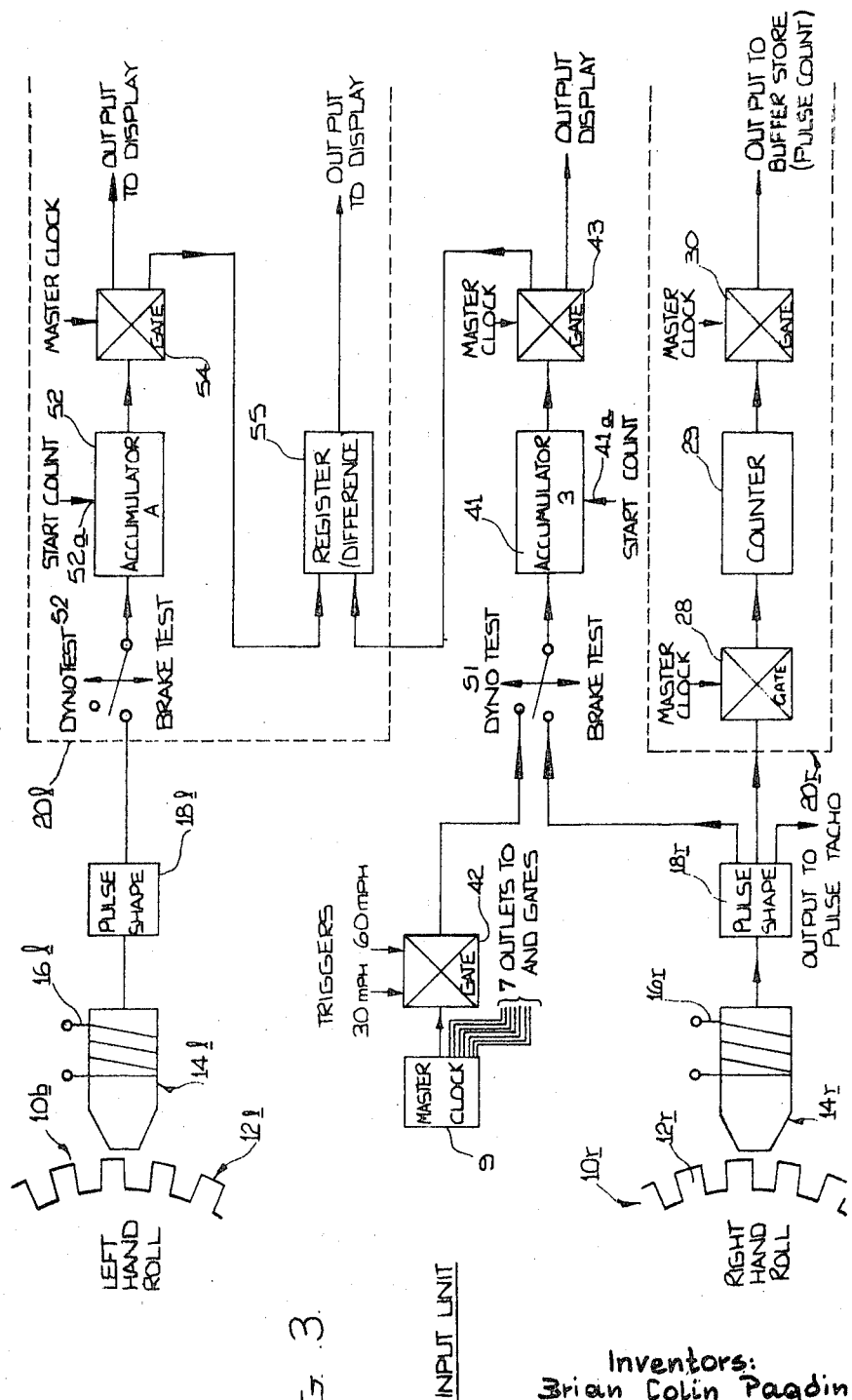
FIG. 3 is a schematic circuit diagram of an input section of the apparatus.

Signal generator means associated with each roller assembly for generating a series of primary pulses is shown diagrammatically in FIG. 3 and may comprise a rotary armature having poles moved past an electromagnetic sensing head provided with a winding in which a primary signal is generated in response to the passage past such head of a single pole. The poles may be permanent magnets or made of magnetically conductive material. An arrangement of this character is illustrated diagrammatically in FIG. 3 wherein armatures 10*l* and 10*r* formed on, secured to, or driven rotatably with or by respective rollers 104*l*, 104*r* have poles 12*l* and 12*r* moving past sensing heads 14*l* and 14*r* incorporating windings 16*l* and 16*r*.

Outputs from these windings are transmitted in each case to pulse shaping circuits 18*l* and 18*r* which deliver respective trains of square wave pulses from their outputs. Typically the pulse repetition rate may be approximately 1,000 pulses for each revolution of the associated roller. At the maximum speed at which the roller would rotate (about 10,000 r.p.m.) corresponding to maximum velocity for the vehicle under test, the pulse repetition period would be about six microseconds. The pulses may typically be of three microseconds duration with an inter-pulse interval of three microseconds. The pulse shaping circuits may be designed to maintain constant signal pulse width over the velocity range (the inter-pulse intervals thus increasing for the slower velocities).

The trains of pulses delivered by the pulse shaping circuits 18*l* and 18*r* constitute the primary signals and these contain data which enables all of the quantities above mentioned to be determined by suitable arithmetical operations thereon performed by an electrical computer means.

The computer means illustrated performs the arithmetical operations digitally.

The various circuit means embodied in the computer means for this purpose will best be understood by describing the sequence of operations but, for convenience, the following main parts of the computer means are identified as follows.

Firstly, as seen in FIG. 3, an input section of the computer means includes two input channels 20*l* and 20*r* in which primary signals from left-hand and right-hand roller assemblies are handled. Further, a control signal generator is provided furnishing a relatively long pulse, which typically may have a duration of 0.1 seconds, for the purpose firstly of sub-dividing the primary signals into discrete groups, each group pertaining to a sampling period. The number of primary signals in a group is not critical provided it is sufficient to enable arithmetical operations to be performed. A short inter-pulse interval, typically in the range one to 10 microseconds, is allowed between long pulses of the control signal (and hence between the last pulse of one group and the first pulse of the next group) for transfer, after each sampling period, of the contents of counter circuits to buffer store circuits as hereinafter described.

The control pulse generator is indicated diagrammatically at 9 and may be a master clock. This master clock provides outlets to eight gate circuits as hereinafter described.

Figure 4:
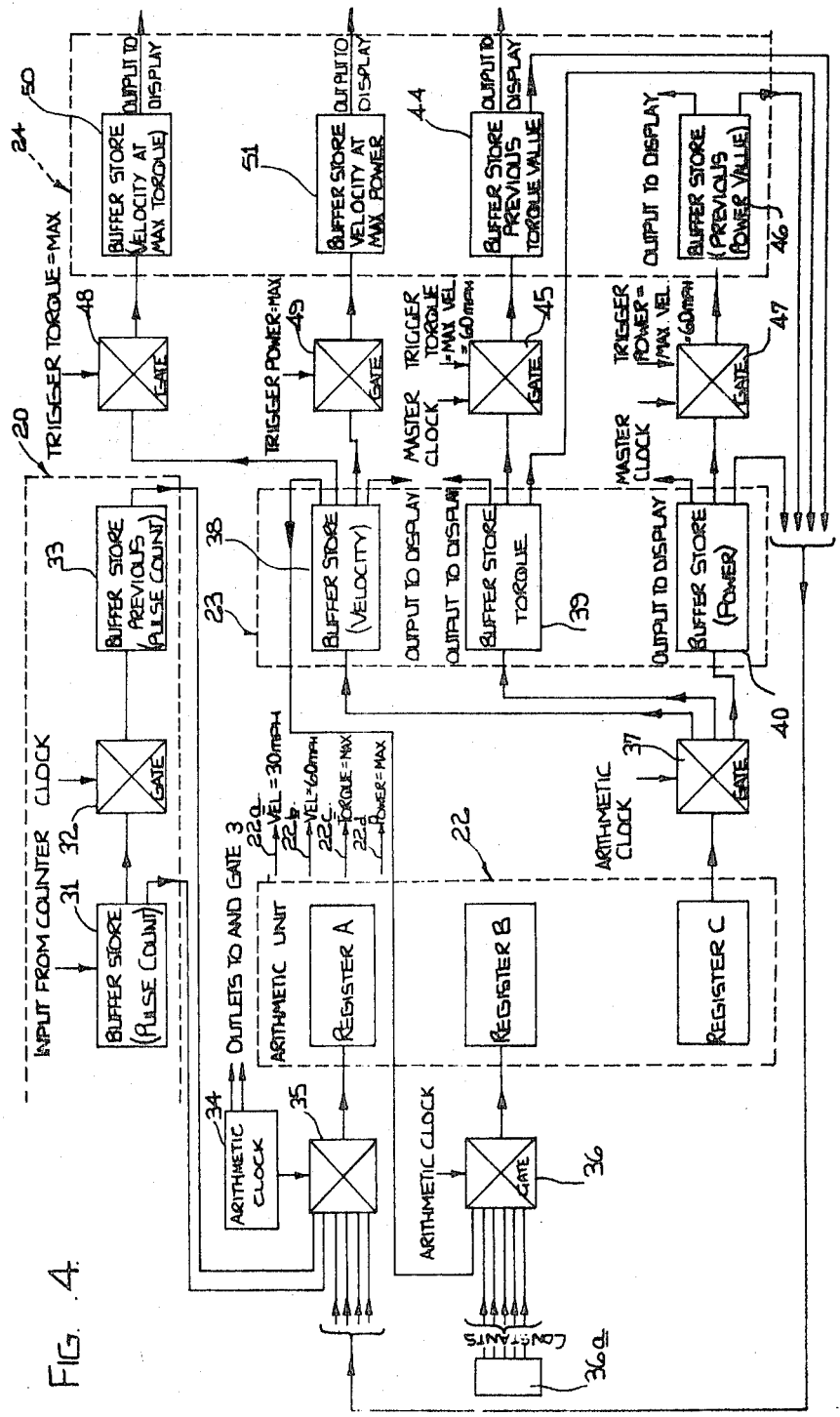
FIG. 4 is a schematic circuit diagram of a further section in which the primary signal is subjected to arithmetical operations to generate the quantities to be determined for a vehicle or other apparatus under test.

The input channel 20*r* serves to register and store the number of pulses of the primary signal contained in two succeeding sampling periods (certain components of this channel are, for convenience, shown in FIG. 4 as hereinafter mentioned).

Channel 20*l* provides for counting of the overall number of pulses in the primary signal from the beginning to the end of a testing cycle, and comparison of this number with the corresponding number applied to channel 20*r*, so as to provide an output which is representative of the difference in the distances travelled effectively by left and right-hand wheels, of the vehicle, this being of significance in testing the braking means of the vehicle.

The arithmetic section of the computer means includes an arithmetic unit 22 (FIG. 4) in which the requisite arithmetical operations are performed utilizing the numerical data stored in binary form in channel 20*r* to generate quantities representative of velocity, torque (and acceleration), and power held in further stores 23. Further, this section includes stores 24 for storing numerical data in binary form pertaining to the quantities velocity at maximum torque, velocity at maximum power, torque at selected velocity, or maximum value of torque as required, and power at selected velocity, or maximum value of power as required.

Figure 5:
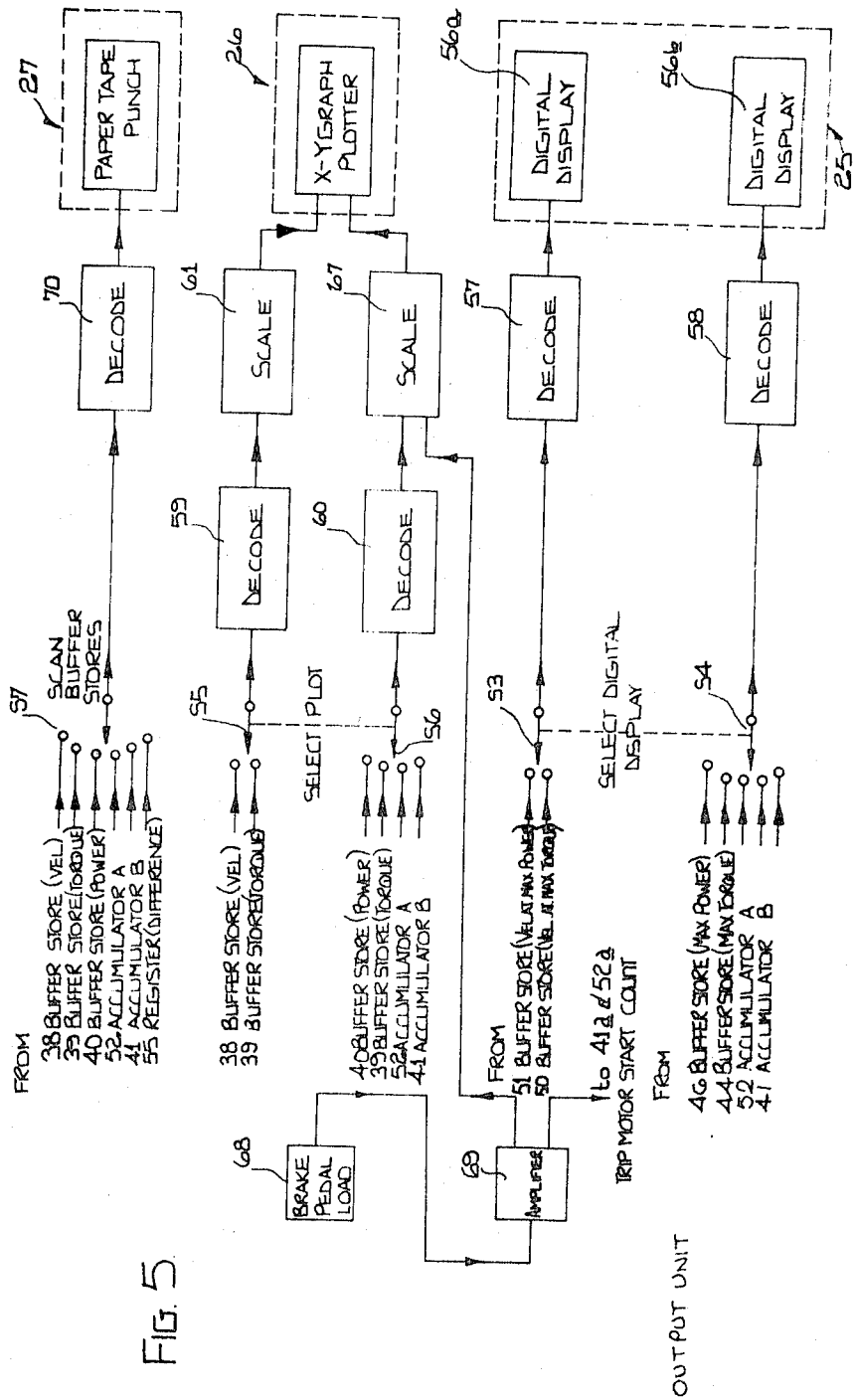
FIG. 5 is a schematic circuit diagram illustrating a further section of the apparatus providing display and/or recording of the quantities determined.

Finally, the computer includes a display section, as seen in FIG. 5, which incorporates display means 25 for displaying certain of the quantities in decimal form, and includes, optionally, a plotting unit 26 for furnishing the graphical relationship between certain selected pairs of the quantities as hereinbefore noted, a recording device 27 for recording any of the quantities required together with decoding and scaling circuits necessary to convert the inputs to the assemblies or units 25 to 27 to the required form.

The computer means illustrated in the drawings will now be described with reference to a complete cycle of operations. Referring firstly to the use of the apparatus to measure the quantities velocity, acceleration, torque, and brake horse power presented by the driving wheels of the vehicle during operation of the engine, the vehicle, after having been driven onto the bed plate or platform 101 with its wheels such as 105 resting respectively on the rollers 104*l*, 104*r* of the roller assemblies, is driven in the normal manner to accelerate the driving wheels from rest up to maximum or other predetermined speed, changing the ratios of the vehicle gear box if required, or utilizing only a single gear, for example high or top gear, afforded thereby.

Trains of primary signals are generated in the sensing heads 14*l* and 14*r* and are subjected to pulse shaping and fed to the channels 20*l* and 20*r* respectively.

Concurrently, control pulses typically having a duration of 0.1 second and inter-pulse interval of one microsecond, as already mentioned, are furnished by the master clock 9.

Selector switches $S_1$ and $S_2$ in the channels 20*r* and 20*l* are set to the dynamometer test position to close the movable contact with respect to the upper of the fixed contacts shown.

In the channel 20*r* control signal pulses and primary signals are fed respectively to two inputs of a gate circuit 28 which delivers groups of primary signal pulses at its outlet. The number of primary pulses contained in each group is dependent upon the speed of rotation reached by the right-hand driving wheel of the vehicle over the time interval co-existing with the control pulse concerned, and representing the sampling period.

The number of primary pulses in each sampling period is counted sequentially by a counting circuit 29 which may be a "ring" or "ripple-through" counter and is registered therein by the setting of stages of the counter in '0' and '1' states respectively as a numeral in binary notation.

A further AND gate circuit 30, having an input to which the control signal from 9 is applied, and having an input connected to the counting circuit 29, delivers an output consisting of the number, in binary form, stored in the register of the counting circuit 29 at the end of the particular control pulse defining the sampling period in which this number was stored originally in the counting circuit 29.

This number is thus transferred, also in binary form, to a buffer store 31 (FIG. 4) having an input connected to the output of gate circuit 30, and having two outputs, the one of which is connected to a further AND gate circuit 32. This is fed at its other input with control signal pulses from the master clock 9. The AND gate circuit 32 thus opens concurrently with onset of the sampling period so as to effect transference of the numeral stored in binary form from the buffer store 31 to a further buffer store 33.

In response to the generation and delivery of each succeeding control pulse from the master clock 9, the numerals registered in the counting circuit 29, in the preceding sampling period, are thus transferred to, the first buffer store 31 and those already in this store are transferred to the further buffer store 33. This leaves the counting circuit 29 free to receive a fresh numeral (set of primary pulses registered in binary form), while the contents of buffer stores 31 and 33 from the two preceding cycles are fed into, and operated upon in, the arithmetical unit 22.

The arithmetical unit 22 is designed to perform various different arithmetical operations, namely determination of velocity, determination of torque (and deceleration), determination of brake horse power, determination of maximum torque, and determination of maximum power, in response to the reception of successive pulses of the control signal representing successive sampling periods.

Control of the sequence of operations is effected by means of a further pulse generating circuit in the form of a clock circuit, herein called the arithmetical clock, which is incorporated in the arithmetical unit 22, but for convenience shown separately as unit 34. The arithmetical clock provides outlets to three AND gate circuits.

The arithmetical unit 22 has three counting circuits or registers A, B, C, each capable of storing a numeral in binary form. The general manner of operation is that numerals are transferred to register A and register B under the control of AND gates 35 and 36, the requisite arithmetical operations are performed, for example multiplication of the contents of register A by register B, and the answer (product, in the case of multiplication) is then developed in register C. The answer is then transferred selectively under the control of AND gate 37 to one of three buffer stores, 38 for velocity, 39 for torque (or acceleration), and 40 for power.

Referring specifically to the sequence of operations, the output of the arithmetical clock 34 consists of a plurality of pulses, typically of 30 microseconds duration with inter-pulse intervals of 5 microseconds, there being at least 36 such pulses (occupying 1,260 microseconds) occurring during a single sampling period of 0.1 seconds.

The time relationship between the primary pulses, the control pulses furnished by the master clock 9, and the pulses furnished by the arithmetical clock for controlling the sequence of arithmetical operations are illustrated diagrammatically in FIG. 8. In section I a train of primary pulses is shown illustrative of a period of acceleration of the wheel of the vehicle under test. For clarity many fewer primary pulses are illustrated than actually occur in practice. In section II the control pulses furnished by the master clock are shown and in section III there is illustrated the two groups of pulses fed during successive periods to the counting circuit 29. It will be understood that typically there may be something of the order of 1,000 to 20,000 pulses in each of these periods depending upon wheel velocity existing at the time of the sampling pulse concerned. Section IV shows the pulses furnished by the arithmetical clock. These occur over a period of typically 1,250 microseconds, that is about 1/100 of the sampling period and for clarity only a few of these pulses have been shown on an expanded time scale for section II relative to that adapted for sections I, II, and III. It will be understood that it is not critical at what stage in each sampling period the arithmetical operations are carried out but conveniently these will be performed starting at some time subsequently to the beginning of the sampling pulse and ending before the termination of the latter, starting typically after the elapse of about 1/5 of the sampling period. It is satisfactory that the sequence of arithmetical operations be conducted only once during each sampling period but if an even higher degree of reliability and accuracy is required the arithmetical operations may be repeated a number of times during each sampling period and the quantities determined thereby may be averaged and/or examined for scatter to develop an average output or to develop a fault signal if the scatter is above a predetermined value, such fault signal being applied to operate an indicating device or inhibit continued operation of the apparatus until the cause for excessive scatter is determined.

The first calculation performed by the arithmetical unit 22 is determination of the velocity of the right-hand driving wheel operating a roller 104r and this is given by the expression:

$$\text{Velocity} = K_2 \frac{(N_1 + N_2)}{2T}$$

Where $K_2$ is a constant, $N_1$ and $N_2$ are the contents of buffer stores 33 (previous pulse count) and 31 (pulse count).

$T$ is the duration of the sampling period.

In effecting this calculation the following numbered pulses from the arithmetical clock perform the following functions.

Arithmetical Clock Pulse No.

0. Enters from master clock cycle at or near the beginning of a sampling pulse furnished by the master clock.
1. Clears all registers A, B and C.
2. Transfers contents of buffer store 33 (previous pulse count) to register A.
3. Adds contents of buffer store 31 (pulse count) to register A.
4. Divides contents of register A by 2.
5. Transfers constant $K_2$ to register B through AND gate 36 from a circuit 36a developing $K_2$ at one of its outlets.
6. Multiplies register A by register B and develops answer in register C.
7. Transfers contents of register C through AND gate 37 to buffer store 38 (velocity).

The second calculation performed is determination of the torque (or deceleration) when the apparatus is used for testing the brake means of the vehicle. If required, positive acceleration during drive can be calculated concurrently with torque, since the only difference is in the numerical value of the constant appearing in the equation.

Torque is given by the expression:

$$\text{Torque} = K_4 \frac{(N_2 - N_1)}{T^2}$$

Where $K_4$ is a constant and other terms have the same significance as above stated.

If acceleration or deceleration is to be determined a constant $K_3$ would be utilized in place of $K_4$.

Continuing the sequence of arithmetical pulses the following operations are effected in response thereto.

Arithmetical Clock Pulse No.

8. Clears all registers A, B and C.
9. Transfers contents of buffer store 33 (previous pulse count) to register A (it will be noted that the numeral stored in 33 will be the same numeral as that existing during the velocity calculation).
10. Subtracts contents of buffer store 31 (pulse count) from register A (again the numeral stored in 31 is the same as that existing during calculation of velocity).
11. Transfers constant $K_4$ from outlet of circuit 36a, developing this through AND gate 36 to register B (alternatively transfers constant $K_3$ for determination of acceleration or deceleration).
12. Multiplies register A by register B and develops answer in register C.
13. Transfers contents of register C through AND gate 37 to buffer store 39 (torque) (alternatively buffer store 39 used for acceleration or deceleration store if these quantities are being determined).

The determination of power, expressed in brake horse power, is by solution of the equation:

$$\text{Brake horsepower} = K_5 \frac{(N_2 - N_1)(N_2 + N_1)}{2T^3}$$

Where $K_5$ is a constant, and the remaining terms have the significance previously stated.

The sequence of operations determined by the arithmetic clock to effect this calculation is as follows.

Arithmetical Clock Pulse No.

14. Clears all registers A, B and C.
15. Transfers contents of buffer store 39 (torque) through AND gate 35 to register A.
16. Transfers contents of buffer store 38 (velocity) through AND gate 36 to register B.
17. Multiplies register A by register B and develops answer in register C.
18. Transfers contents of register C through AND gate 37 to buffer store 40 (power).
19. Clears all registers A, B and C.
20. Transfers contents of buffer store 40 (power) through AND gate 35 to register A.
21. Transfers constant $K_5$ from circuit 36a developing same through AND gate 36 to register B.
22. Multiplies register A by register B and develops answer in register C.
23. Transfers contents of register C through AND gate 37 to buffer store 40 (power).

A further determination which may be required to be made is the total time taken to accelerate from a lower selected speed, for example 30 m.p.h. (or 50 k.p.h. say), to a higher selected speed, for example 60 m.p.h. (or 100 k.p.h. say). For this purpose an accumulator circuit 41 (FIG. 3) is connected through switch $S_1$ (upper contact) to an AND gate 42 fed from the master clock 9 with pulses at typically 0.1 second intervals and with a trigger input signal to open the gate at, say, 30 m.p.h. and close it at, say, 60 m.p.h.

The contents of accumulator circuit 41 are transferred through AND gate 43 to the output section of the computer means for display or recording. The trigger signals at the two selected speeds, for example 30 m.p.h. and 60 m.p.h., are derived from the arithmetic unit 22 in response to further pulses of the arithmetical clock as follows.

Arithmetical Clock Pulse No.

24. Clears all registers A, B and C.
25. Transfers contents of buffer store 38 (velocity) through AND gate 36 to register B.
26. Subtracts a reference speed (e.g., equivalent to 30 m.p.h. or 60 m.p.h.) from register B.
27. Develops appropriate trigger output at outlet 22a (if register B becomes zero or negative for 30 m.p.h. reference speed) or at outlet 22b (if register B becomes zero or negative for 60 m.p.h. reference speed).

A further determination required to be made is maximum torque developed during the testing cycle. The requisite operations occur in response to arithmetical clock pulses as follows.

Arithmetical Clock Pulse No.

28. Clears all registers A, B and C.
29. Transfers contents of buffer store 39 (torque) through AND gate 35 to register A.
30. Subtracts from register A through AND gate 35 contents of buffer store 44 (previous torque value) transferred from buffer store 39 (torque) through AND gate 45 in response to preceding master clock pulse.
31. Develops trigger signal (torque equals max) at outlet 22c of arithmetic unit 22 if register A becomes zero or negative, such trigger being then applied to an input of AND gate 45 to prevent further transfer from buffer store 39 to buffer store 44, leaving maximum torque value stored in 44 for output to display section.

A further determination required to be made is that of maximum power during the testing cycle and this is effected in response to arithmetical clock pulses as follows.

Arithmetical Clock Pulse No.

32. Clears all registers A, B and C.
33. Transfers contents of buffer store 40 (power) through AND gate 35 to register A.
34. Subtracts from register A through AND gate 35 contents of buffer store 46 (previous power value) transferred thereto through AND gate 47 from buffer store 40 (power) in response to the preceding master clock pulse from register A.
35. Develops trigger signal at outlet 22d of arithmetical unit 22 (if register A becomes zero or negative) and applies this trigger (power equals max) to an input of AND gate 47 to prevent further transfer from buffer store 40 to buffer store 46, leaving maximum power value in 46 for transmission to display section.
36. Clears all registers A, B and C.

The trigger signals developed at 22c (torque equals max) and 22d (power equals max) are also applied to AND gates 48 and 49 respectively to effect transfer therethrough of the values of velocity subsisting in buffer store 38 (velocity) to buffer store 50 (velocity at max torque) and 51 (velocity at max power). These values are then available in buffer stores 50 and 51 for output to the display section.

The buffer stores 44 and 46 may also be utilized selectively to store values of torque and power in response to the incidence of trigger signals other than maximum values of these quantities. Thus, if it is desired to measure torque at a selected velocity, for example 60 m.p.h., this trigger signal can be applied to AND gates 45 and 47 to transfer the value of torque and power then subsisting in buffer stores 39 and 40 to buffer stores 44 and 46 for feeding to the display section.

Following pulse No. 36, the control pulse of master clock 9 terminates, and a new cycle of operations is started.

The operations which take place in response to the onset of the first control pulse from master clock 9, and thereafter, and which occur concurrently with the arithmetical operations performed by the arithmetical unit are as follows.

1. The onset of a control pulse from master clock 9 clears the counting circuit 29 and buffer stores 31, 33, 38, 39, 40, 44, 46, 50 and 51, (this takes place only for the first sampling pulse of a test).
2. Transfers contents of buffer store 31 (pulse count) to buffer store 33 (previous pulse count).
3. Reads contents of counting circuit 29 into buffer store 31 (pulse count).
4. Transfers contents of buffer store 39 (torque) to buffer store 44 (previous torque value).
5. Transfers contents of buffer store 40 (power) to buffer store 46 (previous power value).
6. Reads pulses from sensing head 14 through shaper 18 and AND gate 28 to counting circuit 29.
7. Termination of master pulse at end of sampling period closes gate 28 stopping further read of pulses from sensing head 14 and pulse shaper 18 to counting circuit 29.

Operations 2 to 5 occur almost simultaneously followed by 6 and 7.

When the switches $S_1$ and $S_2$ are set to positions for performing a test of the braking means of the vehicle, the movable contacts are closed with respect to the lower of the fixed contacts and open with respect to the upper fixed contact.

In this position channel 20r can function as previously described and the arithmetical unit 22 provides a deceleration determination which is fed to buffer stores 39 and 44. Additionally, accumulator circuit 41 operates to record the total distance travelled by the right-hand wheel, this being initiated by a signal fed in at 41a in response to operation of the brake applying member, for example the brake pedal.

Channel 20l also contains an accumulator circuit, 52 which may be identical with accumulator circuit 41, and has an inlet 52a at which a start count signal is applied in response to operation of the brake applying member. Pulses developed in the sensing head 15 and shaped in the pulse shaper 19 are thus accumulated in the accumulator circuit 52.

The contents of accumulator circuits 41 and 52 are transferred through AND gates 43 and 54 in response to incidence of pulses from the master clock 9 to a comparison circuit 55 which provides an output dependent upon the difference in the pulse count from each accumulator circuit and thus provides an indication of difference of distance travelled by the left-hand and right-hand wheels of the vehicle under braking conditions.

Referring now to the display section of the computer means as seen in FIG. 5, this includes two decimal display units 56a and 56b, both of which comprise decatron tubes. The data available for operation of these tubes is supplied from the outlets of the circuit shown in FIG. 4 as numerals in binary form, and therefore is passed to decoding circuits 57 and 58 to effect binary to decimal conversion.

Selector switches $S_3$ and $S_4$ control the routing of data from various buffer stores, accumulators and registers to the digital display units 56a and 56b, as indicated in FIG. 5.

A cartesian plotter unit as indicated at 26 may also be provided.

Information is fed thereto from various buffer stages and accumulator circuits as indicated in FIG. 5, through the intermediary of plotting selector switches $S_5$ and $S_6$, binary to analogue decoding circuits 59 and 60, and scaling circuits 61 and 67, unit 68 is provided for measuring brake pedal load and its output amplified in an amplifier 69 for feeding the requisite trip signal to accumulator circuits 41 and 52 and supplying output to scaling circuit 67.

Further, the display section may include a recording device, for example utilizing a punching head and paper tape, for recording information in binary form.

The requisite information in this case is routed to the recording device 27 through a scanning switch $S_7$, the terminals of which are connected to various buffer stores, accumulators and registers as shown in FIG. 5. In this case, the decoding circuit 70 would not require to effect a binary to decimal conversion but may require to convert a series binary notation into a parallel binary notation for feeding respective digits of the binary signal to individual punching heads of the recording device. Further identification signals may be brought in at the decoding circuit to enable signals from various sources, and pertaining to various quantities, to be identified from each other on the record member.

Figure 6:
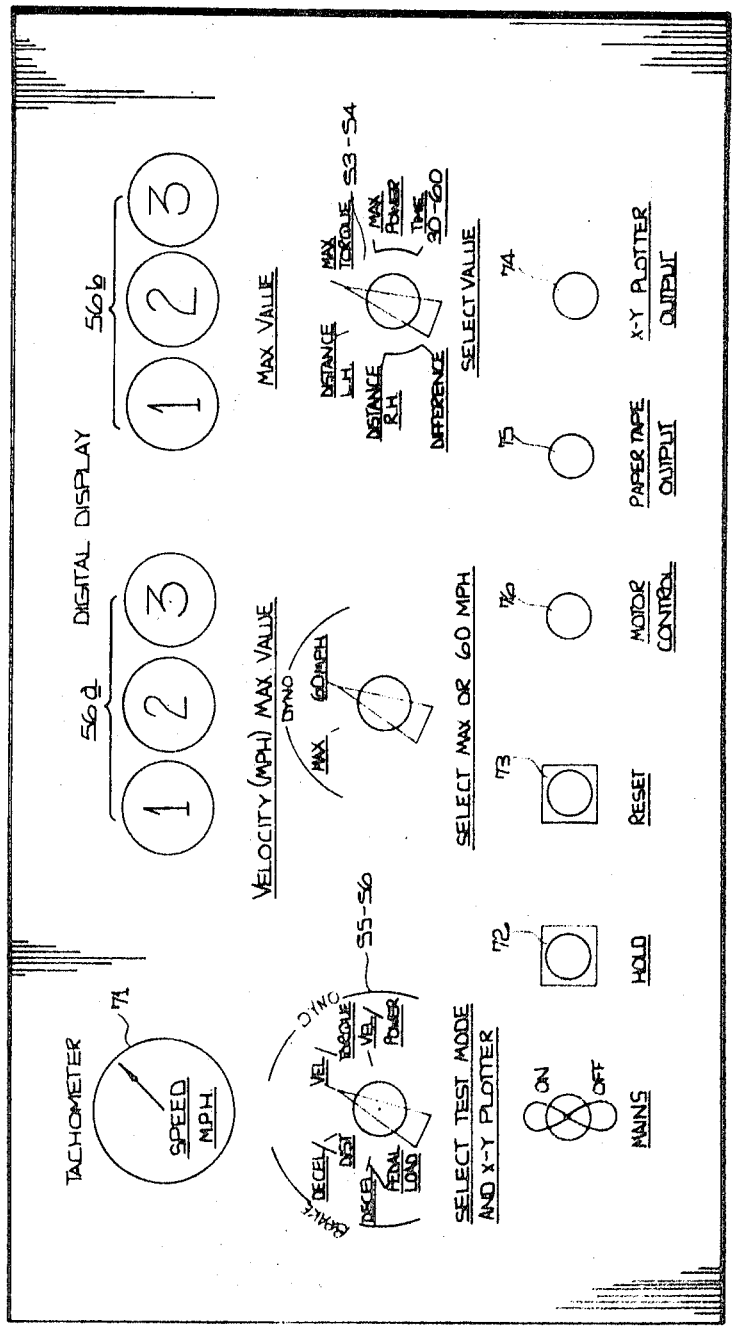
FIG. 6 is a diagrammatic view showing a possible arrangement of control members and display devices which may be provided on the apparatus.

One possible arrangement of controls and display devices is illustrated in FIG. 6.

In addition to the decimal display units 56a and 56b, a tachometer 71 may be provided for indicating the speed at all stages of the test, such tachometer being supplied from buffer store 38 (velocity), switches $S_3$ and $S_4$ may be mechanically coupled to provide for display of velocity at maximum power on one of the decimal display units when the other is utilized for displaying maximum power and to provide for display of velocity at maximum torque when the other display unit is utilized for displaying the value of maximum torque.

Again, switches $S_5$ and $S_6$ may be mechanically coupled.

Manually operable controls 72 may be provided for holding the state of the computer means at any desired instant, and for manual reset as indicated at 73.

It is contemplated that the graphical plotter 26 and the recording device 27 would be provided as optional additions to outputs for operating these devices may be taken from sockets 74 and 75.

A press-button switch 76 may be provided for controlling operation of the electric motor or motors provided for rotating the rollers to bring the vehicle wheels up to the required speed preparatory to the braking test.

Although in the foregoing description and drawings all gate circuits have been referred to as AND gates, it will be understood that the circuit may be designed to require the employment of other forms of gate circuit, namely NAND, OR, NOR, in some or all of the locations in which AND gates are shown.

The apparatus permits of the attainment of a high degree of accuracy and rapid determination of all of the quantities referred to. Moreover, problems associated with the absorption of power delivered by the prime mover under test are eliminated since after the driving wheels have been brought up to full speed the vehicle brakes can be utilized to effect stopping of both these wheels and the rotary inertia members of the apparatus. The energy to be dissipated by the brakes is limited to that stored kinetically, whereas with conventional absorption dynamometers the energy to be dissipated depends upon the duration of the overall test cycle. The latter is much higher (typically three minutes) than is the case for the present method and apparatus, for which, typically, an overall cycle time is about 10 seconds.

What is claimed is:

1. An inertia dynamometer for measuring one or more selected quantities in an equation of motion of a rotary output member of a vehicle or machine and comprising a supporting structure, means providing a rotary inertia load including roller means rotatably mounted on said supporting structure for contacting said output member, and measuring means connected to said roller means for measuring said quantity, wherein the measuring means comprises:
   a. means for generating a series of primary signals, the number of which occurring in a given period is dependent upon the angular displacement of said roller means occurring in the same period,
   b. an electrical computer means including
      i. means for storing said primary signals,
      ii. means for performing arithmetical operations on said stored signals in a manner to derive an output signal representative of said selected quantity or quantities,
      iii. means responsive to receipt of said output signals for displaying said quantity of quantities, and wherein:
   c. a plurality of said roller means are mounted on said supporting structure at respective positions spaced apart axially to contact road wheels of a vehicle mounted coaxially with each other,
   d. a drive motor common to said axially spaced roller means is provided,
   e. said drive motor is connected to said axially spaced roller means through means for establishing drive from said motor to said roller means in one direction of rotation while allowing overrun of said roller means with respect to said motor in the same direction of rotation.

2. An inertia dynamometer for measuring one or more selected quantities in an equation of motion of a rotary output member of a vehicle or machine and comprising a supporting structure, means providing a rotary inertia load including roller means rotatably mounted on said supporting structure for contacting said output member, and measuring means connected to said roller means for measuring said quantity, wherein the measuring means comprises:
   a. means for generating a series of primary signals, the number of which occurring in a given period is dependent upon the angular displacement of said roller means occurring in the same period,
   b. an electrical computer means including
      i. means for storing said primary signals,
      ii. means for performing arithmetical operations on said stored signals in a manner to derive an output signal representative of said selected quantity or quantities,
      iii. means responsive to receipt of said output signals for displaying said quantity or quantities, and wherein the electrical computer means further includes:
   c. means for generating a series of master control signals of respective durations to define sampling periods,
   d. means for gating said master control signals with said primary signals to derive a plurality of successive groups of primary signals in successive sampling periods, and
   e. means for feeding at least two of said groups to said means for performing arithmetical operations.

3. A dynamometer according to claim 2 wherein said electrical computer means further includes:
   a. means for storing said output signal representative of said quantity to be measured,
   b. means for successively updating said storage means as one sampling period succeeds another,
   c. means for generating a trigger signal in response to occurrence of a predetermined value of said quantity,
   d. means for holding the stored signal in said storage means in response to occurrence of said trigger signal.

4. A dynamometer according to claim 3 wherein:
   a. said means for generating said trigger signal is responsive to the maximum value of said quantity,
   b. said storage means is connected to an outlet of said means for performing arithmetical operations providing the output signal representing said quantity, and thereby providing storage of the maximum value thereof during a measurement operation.

5. A dynamometer according to claim 3 wherein:
   a. said storage means is connected to an outlet of said means for performing arithmetical operations providing an output signal representative of a first quantity to be measured, and
   b. said means for generating said trigger signal is responsive to a predetermined value of an output signal representative of a second quantity whereby said storage means provides storage of a signal representative of the value of the first quantity when the second quantity has said predetermined value.

6. A dynamometer according to claim 2 wherein said means for storing said output signal includes:
   a. at least one initial storage circuit,
   b. a corresponding number of further storage circuits,
   c. gate means connected each in a channel between said initial storage circuit and a corresponding further storage circuit and connected to said means for generating master control signals so that updating of output signals takes place by transference of stored output signals from said initial storage circuit to the corresponding further storage circuit.

7. A dynamometer according to claim 6 further including:
a. means for generating a trigger signal in response to occurrence of an output signal representing a predetermined value of a quantity to be measured,
b. means for feeding said trigger signal to close said gate means in the channel between at least one of said initial and further storage circuits.

8. An inertia dynamometer for measuring one or more selected quantities in an equation of motion of a rotary output member of a vehicle or machine comprising:
a. rotary inertia means,
b. means for establishing said inertia means and said output member in mutual power transfer relation with each other to set up rotation of either in response to rotation of the other at a corresponding speed,
c. means for generating a series of primary signals in response to rotation of said inertia means, the number of which occurring in a given period is dependent upon the angular displacement of said roller means occurring in the same period,
d. an electrical computer means including
  i. means for storing at least two groups of the primary signals occurring in respective time spaced sampling periods,
  ii. means for performing arithmetical operations on said groups to derive an output signal representative of said selected quantity or quantities,
  iii. means responsive to receipt of said output signal for displaying said quantity or quantities.

9. A dynamometer according to claim 8 wherein:
a. said dynamometer further comprises a supporting structure,
b. a plurality of roller means are mounted at respective positions on said supporting structure for contacting respective road wheels of a road vehicle,
c. said rotary inertia means are in power transfer relation with said roller means and have a moment of inertia of a value such as to transfer power from or to said vehicle at a rate comparable with that occurring when the vehicle is being driven or braked under conditions of road use,
d. said means for performing arithmetical operations derives solely from said groups of primary signals an output signal which is a function of vehicle driving or braking torque.

10. A dynamometer according to claim 8 wherein:
a. said computer means includes means for storing said output signal representative of said quantity to be measured,
b. means for successively updating said storage means as one sampling period succeeds another,
c. means for generating a trigger signal in response to occurrence of a predetermined value of said quantity,
d. means for holding the stored signal in said storage means in response to occurrence of said trigger signal,
e. said display means includes means for displaying said stored signal upon establishment thereof and during the remainder of a test cycle.

11. A dynamometer according to claim 8 wherein said display means includes a plotter means for displaying said output signal in coordinate relation to an independent variable over the period of a test cycle.

12. A dynamometer according to claim 8 wherein:
a. said dynamometer further comprises a supporting structure,
b. a plurality of roller means are mounted at respective positions on said supporting structure for contacting respective road wheels of a road vehicle,
c. said computer means includes means separately to derive output signals from respective ones of said roller means during a braking test cycle of said vehicle.

13. A dynamometer according to claim 12 wherein:
a. a plurality of said rotary inertia means are provided,
b. respective ones of said rotary inertia means are in power transfer relation with respective ones of said roller means,
c. said computer means includes respective accumulator means for accumulating a count of primary signals derived from respective ones of said rotary inertia means,
d. said display means includes means for displaying output signals derived from respective ones of said rotary inertia means.

* * * * *